(12) United States Patent
Ogata et al.

(10) Patent No.: US 6,409,601 B2
(45) Date of Patent: *Jun. 25, 2002

(54) ENTERTAINMENT SYSTEM AND SUPPLY MEDIUM

(75) Inventors: Hiroki Ogata; Shigehisa Miyasaka; Nobuhiro Komata, all of Tokyo (JP)

(73) Assignee: Sony Computer Entertainment Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,439

(22) Filed: Jul. 26, 1999

(30) Foreign Application Priority Data

Jul. 31, 1998 (JP) ............................................ 10-218292

(51) Int. Cl.[7] .............................................. A63F 13/02
(52) U.S. Cl. ...................... 463/37; 463/43; 273/148 B
(58) Field of Search ........................ 273/148 B; 463/30, 463/31, 36, 37, 38, 47

(56) References Cited

U.S. PATENT DOCUMENTS

| | | | |
|---|---|---|---|
| 4,720,789 A | | 1/1988 | Hector et al. |
| 5,326,104 A | * | 7/1994 | Pease et al. ............. 273/138 A |
| 5,551,701 A | | 9/1996 | Bouton et al. ................. 463/36 |
| 5,649,861 A | * | 7/1997 | Okano et al. ................. 463/30 |
| 5,707,160 A | | 1/1998 | Bowen ....................... 400/472 |
| 5,759,100 A | * | 6/1998 | Nakanishi .................... 463/37 |
| 5,769,719 A | * | 6/1998 | Hsu ............................. 463/37 |
| 6,001,017 A | * | 12/1999 | Okano et al. .................. 463/43 |
| 6,108,515 A | * | 8/2000 | Freeman ...................... 434/321 |

FOREIGN PATENT DOCUMENTS

| | | | |
|---|---|---|---|
| DE | 3700913 A1 | 7/1988 | ........... G06F/3/023 |
| EP | 0226392 A2 | 6/1987 | ........... G06F/3/023 |
| EP | 0834338 A2 | 4/1998 | ............. A63F/9/22 |
| GB | 2062318 A | 5/1981 | ............ G09B/5/00 |
| JP | 2569815 | 2/1998 | |
| TW | 162874 | 7/1991 | |
| WO | WO98/15328 | 4/1998 | |

OTHER PUBLICATIONS

Patent Abstracts of Japan, JP 05–337254, Published Dec. 21, 1993, Konami KK.

* cited by examiner

Primary Examiner—Joe H. Cheng
Assistant Examiner—Julie Brocketti
(74) Attorney, Agent, or Firm—Lerner, David, Littenberg, Krumholz & Mentlik, LLP

(57) ABSTRACT

A main memory stores an operating guidance program for displaying operating guidance on a display monitor and enabling control members of a manual control input device to emit continuous or flickering light in relating to the operating guidance. Based on a command from the manual control input device, a CPU executes the operating guidance program stored in the main memory. The operating guidance program enables the control members to emit continuous or flickering light sequentially and displays operating guidance for at least the control members which are emitting continuous or flickering light on the display monitor. Not only the operating guidance is displayed on the display monitor, but also visual sensations are given to the game player by controlling the control members to emit continuous or flickering light on the manual control input device.

20 Claims, 19 Drawing Sheets

FIG. 1  1 VIDEO GAME APPARATUS

FIG. 2  1 VIDEO GAME APPARATUS

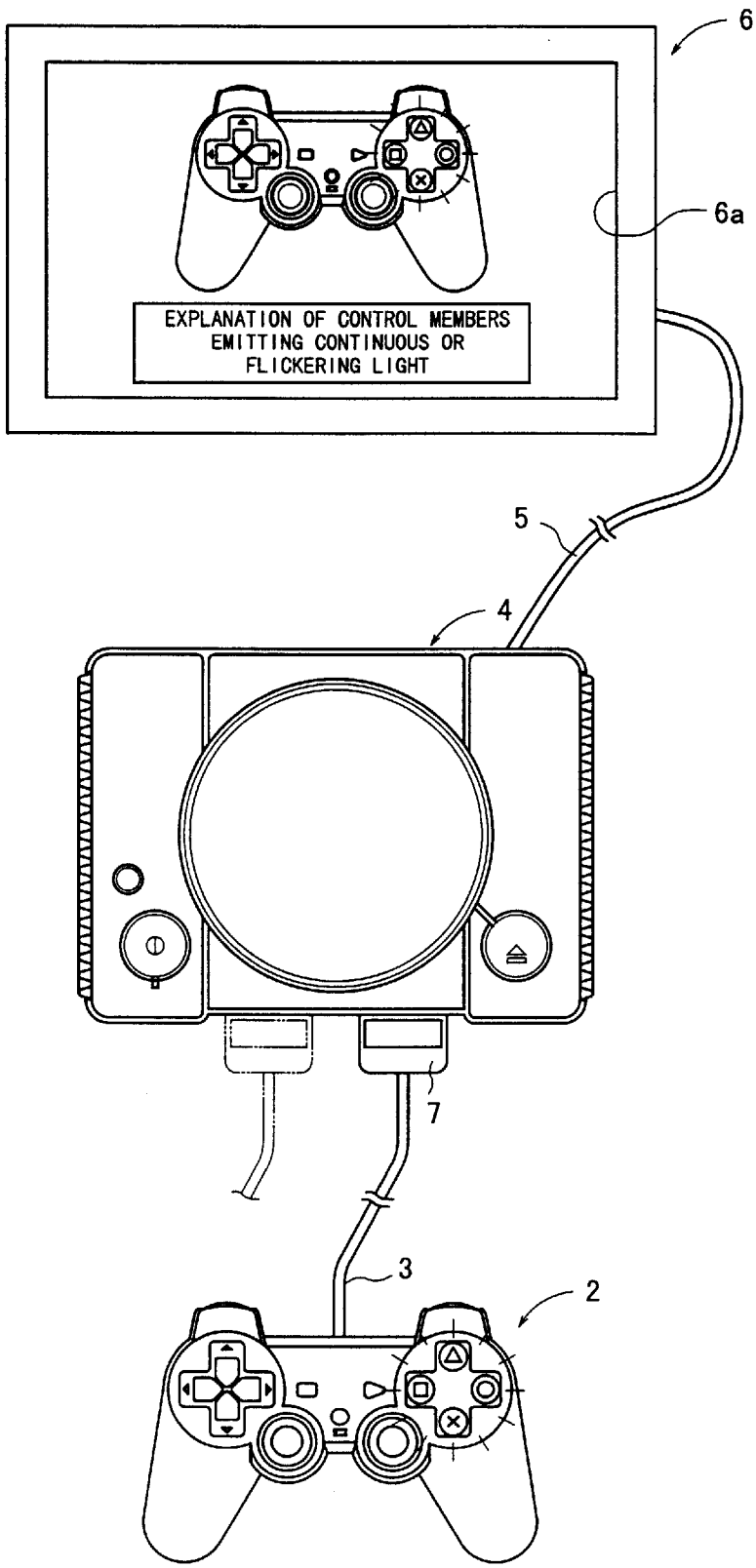

- BOTH LEGS JUMP
- RIGHT LEG JUMP
- LEFT LEG JUMP
- RIGHT-HANDED THROW
  ⋮

6a

| | |
|---|---|
| BOTH LEGS JUMP | B8, B10, b51 |
| RIGHT LEG JUMP | B10, b51 |
| ⋮ | ⋮ |

FIG. 23

① B8 → LIGHT EMISSION

② B10 → LIGHT EMISSION

③ b51 → LIGHT EMISSION

ENTERTAINMENT SYSTEM AND SUPPLY MEDIUM

BACKGROUND OF THE INVENTION

The present invention relates to an entertainment system including a video game machine for displaying an image of game characters, etc. on a display monitor to proceed with a video game in response to control input commands manually entered by the game player via a manual control input device, and to a supply medium for supplying to such an entertainment system a program and data providing operating guidance for the manual control input device with respect to each video game that can be played.

Conventional video game apparatus for displaying game characters, etc. created by computer graphics (CG) on a display monitor such as a television receiver or the like to proceed with a video game each have at least one manual control input device peculiar to the video game apparatus. For example, if one user or game player plays a role-playing game, the game player moves, presses, or rotates a plurality of control members on a manual control input device with his hands or fingers to move a game character or an object displayed on the screen of a display monitor.

Recent years have seen a number of game programs developed for entertainment systems including these video game apparatus. These game programs include many role-playing game programs, combat game programs, car race game programs, sports game programs, etc.

The game programs are supplied to video game entertainment systems from randomly accessible recording mediums such as CD-ROMs, memory cards, etc. or networks. When different video games are played according to the game programs, different functions are assigned to the control members on the manual control input device depending on the game programs.

Therefore, the different game programs are usually accompanied by respective printed user manuals showing how player characters and objects move when the user or game player operates control members on the manual control input device in certain ways. According to the recent trend of video games, displayed player characters and objects move in more complex patterns than before, requiring the game player to operate control members on the manual control input device in more complex patterns. The user manuals necessarily contain more explanations and instructions for teaching the game player how to operate the control members. The game player often finds the user manuals cumbersome to read before or when playing the video game.

One way to replace the printed user manuals for providing operating guidance to the game player is to give the game player voice guidance by way of audible training details. However, voice guidance is not effective because access to any desired point in the guidance is not easy and quick, and the game player needs to be in a quiet environment in order to be able to understand the voice guidance correctly.

According to an alternative scheme, an operating guide is displayed on the display monitor to give the game player a visual aid in understanding game instructions. The visual operating guide displayed on the display monitor only is not sufficient to enable the game player to gain an easy understanding of how to operate control members in complex patterns.

SUMMARY OF THE INVENTION

It is therefore an object of the present invention to provide a supply medium for supplying an operating guidance program and data for displaying an operating guide on a display monitor and also displaying visual guidance on a manual control input device to give visual sensations to the user or game player in relation to the operating guide, and an entertainment system which is supplied with the operating guidance program and data from the supply medium for enabling the user or game player to visually recognize the operating guide on the display monitor and the manual control input device for proceeding with a video game.

An entertainment system according to the present invention includes a manual control input device for entering control commands, the manual control input device having a plurality of control members, a display monitor for displaying a game image, a video game machine for generating an image of a game character to be displayed on the display monitor in response to control commands entered by the manual control input device to proceed with a video game, a memory medium for storing an operating guidance program for displaying an operating guide on the display monitor and enabling the control members of the manual control input device to emit continuous or flickering light, and a processor for executing the operating guidance program stored in the memory medium based on control commands entered by the manual control input device.

A supply medium according to the present invention supplies an operating guidance program and data for displaying an operating guide on a display monitor and enabling control members of a manual control input device to emit light, i.e., continuous or flickering light, in relation to the operating guide.

The operating guidance program and data are capable of not only displaying the operating guide on the display monitor, but also producing visual guidance to give visual sensations to the user by controlling the control members to emit continuous or flickering light on the manual control input device. An entertainment system which is supplied with the operating guidance program and data allows the user to visually recognize the operating guide and to proceed with a video game on both the display monitor and the manual control input device.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 15 is a view showing the manner in which control members of the manual control input device emit continuous or flickering light;

FIG. 23 is a view of a specific example of IDs and continuous or flickering light information of control members of the manual control input device.

DETAILED DESCRIPTION

An embodiment in which an entertainment system according to the present invention is applied to a video game apparatus for playing a video game, and an embodiment in which a supply medium according to the present invention has recorded therein a program and data executed by the video game apparatus will be described below with reference to the drawings.

Figure 1:
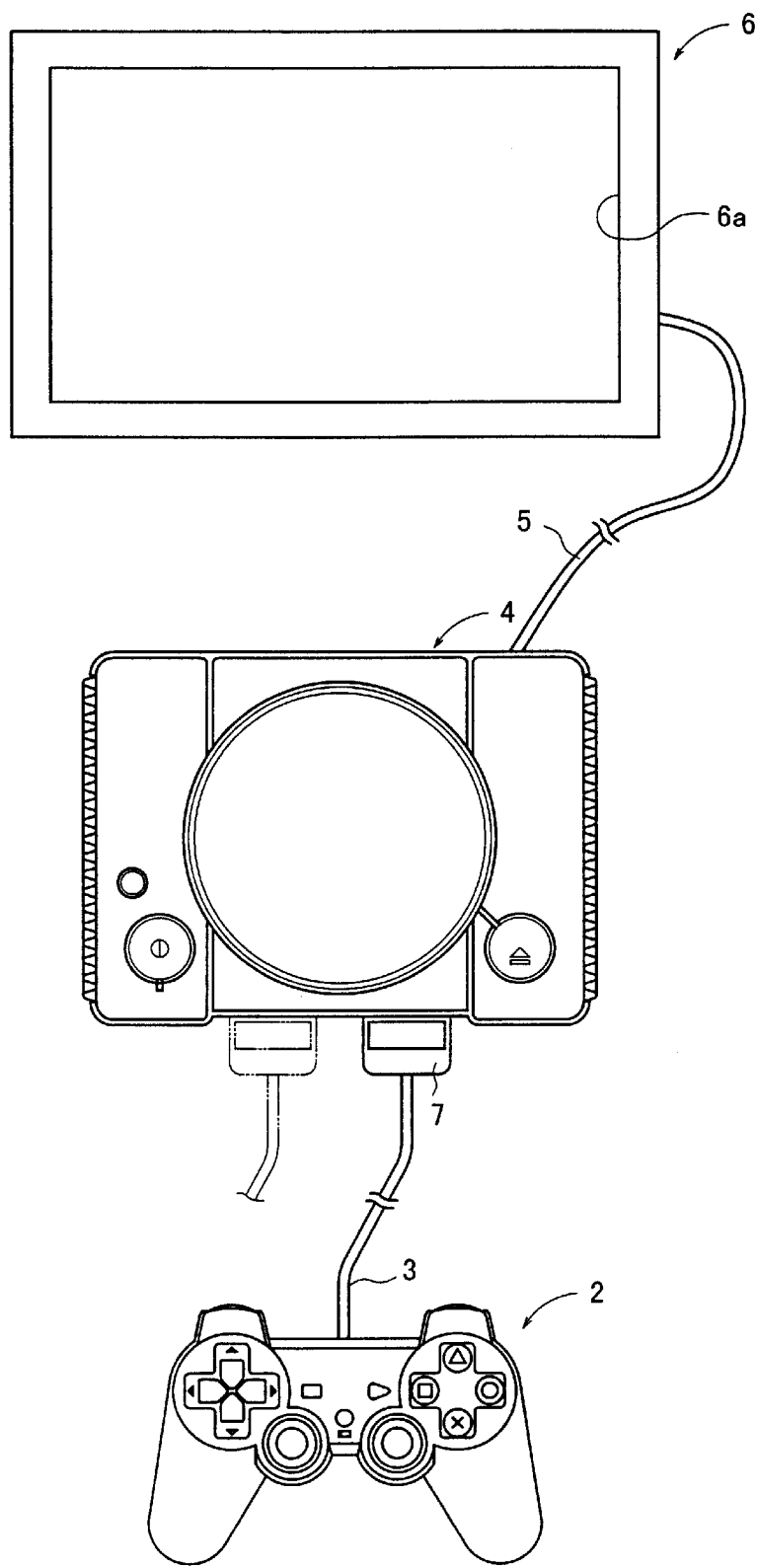
FIG. 1 is a view of a video game apparatus as an entertainment system according to the present invention.

As shown in FIG. 1, a video game apparatus 1 comprises a manual control input device 2, a video game machine 4 for reading a game program in response to a user's control action entered via the manual control input device 2 and generating a game character or characters and a background image according to image processing based on CG, for example, and a display monitor 6 such as a television receiver or the like for displaying the game character or characters and the background image that are generated by the video game machine 4.

The manual control input device 2 and the video game machine 4 are connected to each other by a cable 3, and the video game machine 4 and the display monitor 6 are connected to each other by a cable 5. Alternatively, control signals and data may be transmitted between the manual control input device 2, the video game machine 4, and the display monitor 6 by way of wireless communications, rather than the cables 3, 5.

Figure 2:
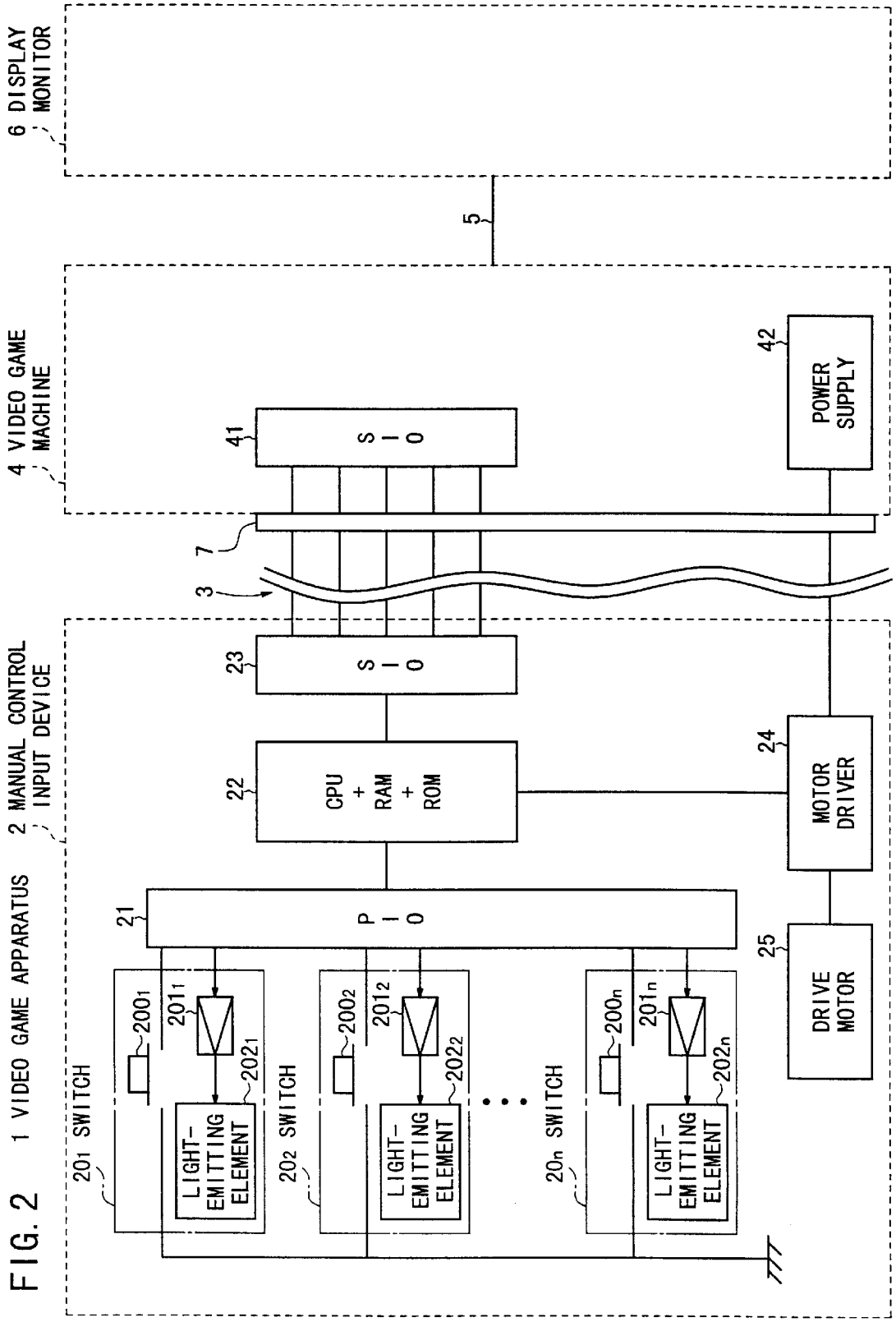
FIG. 2 is a block diagram of a circuit arrangement of the video game apparatus.

FIG. 2 shows in block form a circuit arrangement of the video game apparatus 1. Particularly, circuit details of the manual control input device 2 will be described below, and circuit details of the video game machine 4 will be described later on. Details of the display monitor 6 will not be described because they are well known in the art and have no direct bearing on the present invention.

The manual control input device 2 comprises a plurality of switches $20_1, 20_2, \ldots 20_n$ having respective control members $200_1, 200_2, \ldots 200_n$ such as buttons, sticks, etc., a parallel I/O interface (PIO) 21 for being supplied with control signals from the switches $20_1, 20_2, \ldots 20_n$, a one-chip microcomputer 22 including a central processing unit (CPU), a random-access memory (RAM), and a read-only memory (ROM) fabricated on a single chip, a serial I/O interface (SIO) 23 for performing serial communication with the video game machine 4, and a motor driver 24 for supplying a drive current to a drive motor 25 to vibrate the manual control input device 2 based on a vibration generating command which is adaptively issued from the video game machine 4.

The switches $20_1, 20_2, \ldots 20_n$ include, in addition to the control members $200_1, 200_2, \ldots 200_n$, respective amplifiers $201_1, 201_2, \ldots 201_n$ for amplifying drive signals to enable the control members $200_1, 200_2, \ldots 200_n$ to emit continuous or flickering light, and respective light-emitting elements $202_1, 202_2, \ldots 202_n$ such as (light-emitting diodes (LEDs)), for example, for emitting light through the control members $200_1, 200_2, \ldots 200_n$ based on the amplified drive signals from the amplifiers $201_1, 201_2, \ldots 201_n$.

The video game machine 4 has an SIO 41 for performing serial communication with the manual control input device 2. When a connector 7 is connected to the video game machine 4, the SIO 41 and the SIO 23 of the manual control input device 2 are connected to each other by the connector 7 for bidirectional serial communication between the manual control input device 2 and the video game machine 4.

The video game machine 4 also has a power supply 42 for applying a power supply voltage to the motor driver 24 of the manual control input device 2.

A game program read into the video game machine 4 contains a process for selecting a video game or an operating guide.

If the operating guide is selected, then the display monitor 6 displays the operating guide, and the control members $200_1, 200_2, \ldots 200_n$ emit continuous or flickering light in relation to the displayed operating guide to give the user or game player visual guidance based on visual sensations produced by the emitted continuous or flickering light.

The game program also contains a process which displays the operating guide on the display monitor 6 when the operating guide is selected, enables the control members $200_1, 200_2, \ldots 200_n$ of the manual control input device 2 to emit continuous or flickering light in relation to the displayed operating guide to give the user or game player visual guidance based on visual sensations produced by the emitted continuous or flickering light.

Prior to describing structural details for enabling the control members $200_1, 200_2, \ldots 200_n$ to emit continuous or flickering light, the appearance and components of the manual control input device 2 will be described below with reference to FIGS. 3 and 4.

Figure 3:
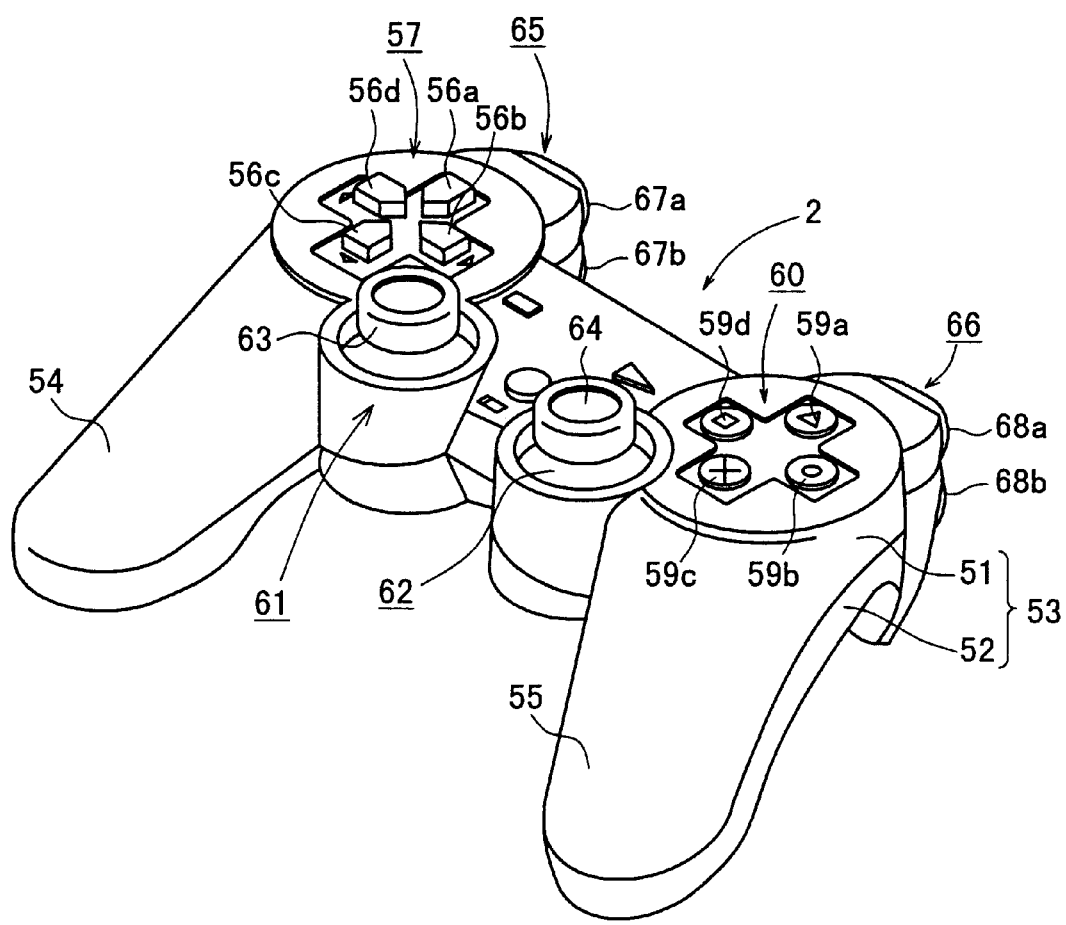
FIG. 3 is a perspective view of a manual control input device of the video game apparatus.

As shown in FIG. 3, the manual control input device 2 has a housing 53 comprising an upper member 51 and a lower member 52 which are mated and joined to each other by fasteners such as screws. A pair of first and second grips 54, 55 project from one side of respective opposite ends of the housing 53. The first and second grips 54, 55 are shaped so as to be gripped by the palms of the left and right hands of the user or game player when the manual control input device 2 is connected to the video game machine 4 and the video game is being played.

The first and second grips 54, 55 are progressively spaced away from each other toward their distal ends and inclined downwardly of the housing 53. To allow the game player to grip the first and second grips 54, 55 comfortably for a long period of time, the first and second grips 54, 55 are tapered from their joint with the housing 53 toward their distal ends, and have arcuate outer peripheral surfaces and arcuate distal end surfaces.

The manual control input device 2 has a first control pad 57 disposed on one end of the housing 53 and comprising first through fourth pressable control members 56a, 56b, 56c, 56d. The first through fourth pressable control members 56a, 56b, 56c, 56d project from an upper surface of the housing 53 and are arranged in a criss-cross pattern. The first through fourth pressable control members 56a, 56b, 56c, 56d are integrally formed with an angularly movable control body that is supported for angular movement about its center, and are positioned around the center of the angularly movable control body.

The first through fourth pressable control members 56a, 56b, 56c, 56d are integrally coupled to each other by the angularly movable control body. The first control pad 57 includes switch elements as signal input elements associated respectively with the first through fourth pressable control members 56a, 56b, 56c, 56d.

The first control pad 57 functions as a directional controller for controlling the direction of movement of a game character or object (hereinafter collectively referred to as a displayed character) displayed on the screen of the display monitor 6. When the game player selectively presses the first through fourth pressable control members 56a, 56b, 56c, 56d to turn on or off the switch elements associated respectively with the first through fourth pressable control members 56a, 56b, 56c, 56d, the displayed character moves in the direction corresponding to the pressed one of the first through fourth pressable control members 56a, 56b, 56c, 56d.

The manual control input device 2 also has a second control pad 60 disposed on the other end of the housing 53 and comprising first through fourth pressable control members 59a, 59b, 59c, 59d. The first through fourth pressable control members 59a, 59b, 59c, 59d project from the upper surface of the housing 53 and are arranged in a crisscross pattern.

The first through fourth pressable control members 59a, 59b, 59c, 59d are constructed as independent members, and are associated with respective switch elements disposed in the second control pad 60. The second control pad 60 serves as a function setting/performing unit for setting a function for a displayed character and performing a function of a displayed character. Specifically, when the game player selectively presses the first through fourth pressable control members 59a, 59b, 59c, 59d, the corresponding one of the switch elements is turned on to set a function for a displayed character and perform a function of a displayed character, which function is assigned to the corresponding switch element.

The manual control input device 2 also has third and fourth control pads 61, 62 disposed respectively at confronting corners defined between the housing 53 and the ends of the first and second grips 54, 55 which are joined to the housing 53.

The third and fourth control pads 61, 62 have respective rotatable control members 63, 64 rotatable 360° about control shafts thereof, and respective signal input elements such as variable resistors or the like which are operable by the respective rotatable control members 63, 64. Specifically, the rotatable control members 63, 64 are mounted on tip ends of the control shafts that are normally urged to return to their neutral positions by biasing members, and can be rotated 360° about the axes of the control shafts.

The third and fourth control pads 61, 62 can move a displayed character while rotating the same or while changing its speed, and can make an analog-like action such as changing the form of a displayed character, when the game player rotates the rotatable control members 63, 64. Therefore, the third and fourth control pads 61, 62 are used as a control unit for outputting commands for a displayed character to perform the above movement or action.

Alternatively, the third and fourth control pads 61, 62 may be used as a control unit for moving a displayed character in an analog fashion in a two-dimensional space in a way related to the manner in which the game player handles an object represented by the displayed character.

The manual control input device 2 also has fifth and sixth control pads 65, 66 disposed on a side of the housing 53 remote from the first and second grips 54, 55 and positioned respectively at the opposite ends of the housing 53. The fifth and sixth control pads 65, 66 have respective pairs of pressable control members 67a, 67b and 68a, 68b and respective switch elements associated with the pressable control members 67a, 67b and 68a, 68b.

The fifth and sixth control pads 65, 66 serve as a function setting/performing unit for setting a function of a displayed character and performing a function of a displayed character. Specifically, when the game player selectively presses the pressable control members 67a, 67b and 68a, 68b, the corresponding one of the switch elements is turned on to set a function of a displayed character and to perform a function of a displayed character, which function is assigned to the corresponding switch element.

Figure 4:
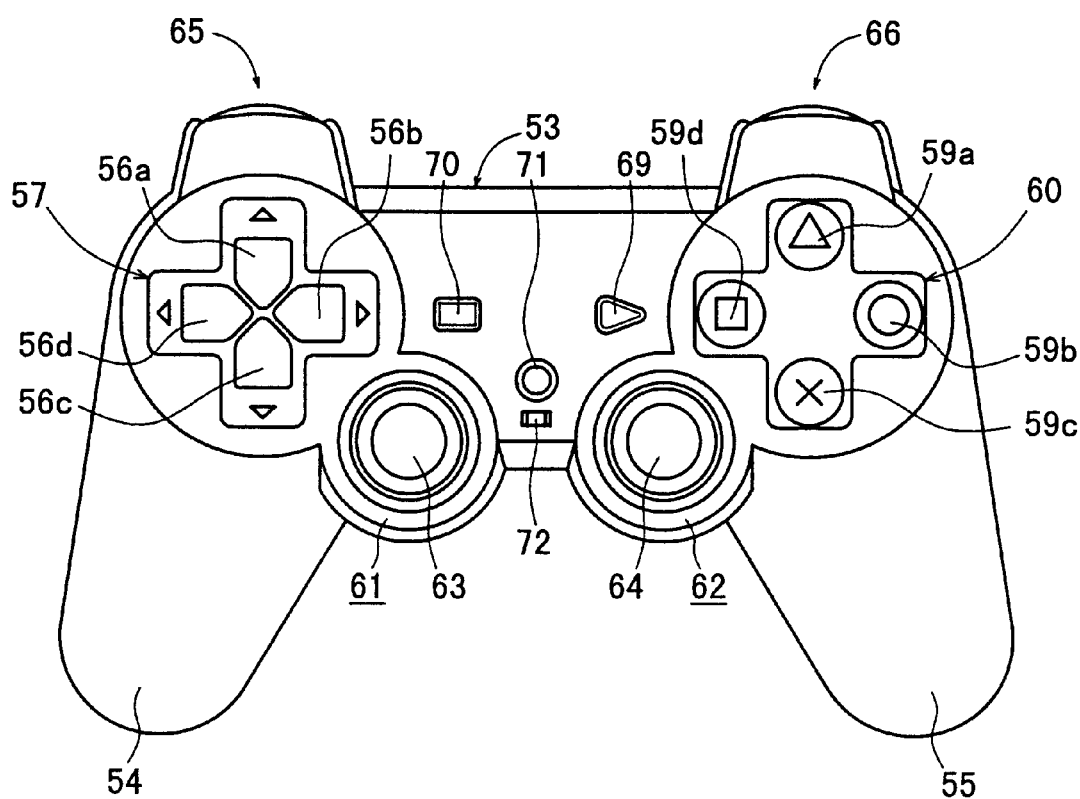
FIG. 4 is a plan view of the manual control input device shown in FIG. 3.

As shown in FIG. 4, the manual control input device 2 has a start switch 69 and a selection switch 70 that are disposed in parallel positions between the first control pad 57 and the second control pad 60 on the upper surface of the housing 53. The start switch 69 starts the video game when pressed, and the selection switch 70 selects a difficulty level of the video game.

The manual control input device 2 also has a mode selection switch 71 and a mode indicator 72 that are disposed between the third and fourth control pads 61, 62 on the upper surface of the housing 53. The mode selection switch 71 selects a control mode of the third and fourth control pads 61, 62 when pressed, and the mode indicator 72 indicates the selected control mode of the third and fourth control pads 61, 62. The mode indicator 72 comprises a light-emitting element such as an LED or the like.

When the mode selection switch 71 is pressed, it can select a control mode for allowing a command signal to be input from the third and fourth control pads 61, 62 or a control mode for inhibiting a command signal from being input from the third and fourth control pads 61, 62.

When the mode selection switch 71 is pressed, it can also select a control mode for allowing a command signal to be input from the third and fourth control pads 61, 62 and selecting the function of the first through fourth pressable control members 59a, 59b, 59c, 59d of the second control pad 60 or the function of the pressable control members 67a, 67b and 68a, 68b of the fifth and sixth control pads 65, 66.

Depending on the control mode selected by the mode selection switch 71, the mode indicator 72 flickers and changes its indication light.

The rotatable control members 63, 64 are rotatable 360° about control shafts thereof. When the rotatable control members 63, 64 are rotated, a CPU in a control system (described later on) within the video game machine 4 acquires data entered depending on the rotation of the rotatable control members 63, 64, and determines a motion pattern according to the acquired data. After having established a motion based on the motion pattern, the CPU controls a graphic generating system to move a displayed character according to the established motion based on the rotation of the rotatable control members 63, 64.

The control members shown in FIGS. 3 and 4 emit continuous or flickering light with the circuit arrangement shown in FIG. 2. For example, the first through fourth pressable control members 59a, 59b, 59c, 59d of the second control pad 60 shown in FIG. 3 are associated respectively with the switches $20_1, 20_2, \ldots 20_n$ shown in FIG. 2.

In the switches $20_1, 20_2, \ldots 20_n$, the light-emitting elements $202_1, 202_2, \ldots 202_n$, which are disposed underneath the respective control members, emit continuous or flickering light based on continuous-light or flickering-light drive signals generated under the control of the CPU in the video game machine 4, i.e., generated when the game program is executed by the CPU. The emitted continuous or flickering light passes through the first through fourth pressable control members 59a, 59b, 59c, 59d. Therefore, it looks to the game player as if the first through fourth pressable control members 59a, 59b, 59c, 59d are emitting the continuous or flickering light.

Actually, each of the first through fourth pressable control members 59a, 59b, 59c, 59d is constructed as shown in FIG. 5, 6, 7, or 8.

Figure 5:
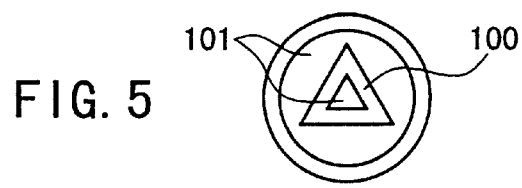
FIG. 5 is a plan view of a control member of the manual control input device.

FIG. 5 shows a control member structure in which the control member doubles as a light guide that includes a portion for emitting opalescent light. As shown in FIG. 5, the control member has a circular base molded of transparent plastic including a triangular area 100 coated in an opalescent color and a remaining area 101 coated in an ornamental color.

Figure 6:
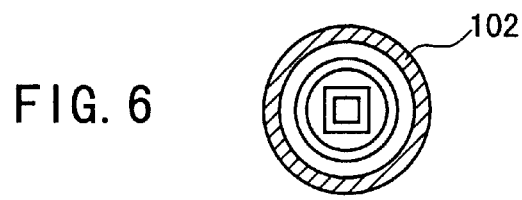
FIG. 6 is a plan view of another control member of the manual control input device.

FIG. 6 shows a control member structure in which a ring-shaped pattern is illuminated around the control member. As shown in FIG. 6, a ring-shaped area around the control member is molded of transparent polycarbonate and serves as a light guide in the form of a ring-shaped illuminating area 102. The control member structure shown in FIG. 6 should preferably incorporate a single light source.

Figure 7:
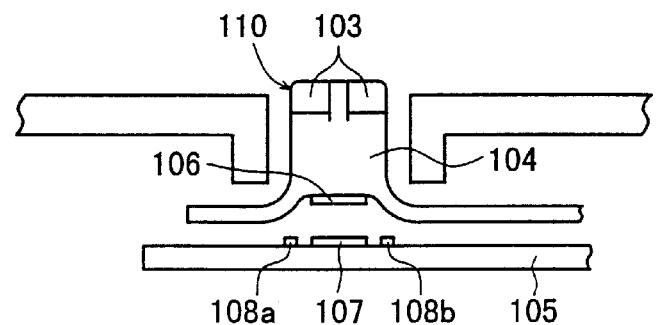
FIG. 7 is a cross-sectional view of a specific control member structure.
Figure 8:
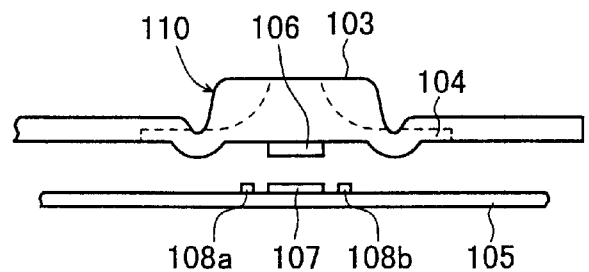
FIG. 8 is a cross-sectional view of another specific control member structure.

Other control member structures are shown in FIGS. 7 and 8. Each of the control member structures shown in FIGS. 7 and 8 comprises a flexible key 104 and a key top 103, which are of a conventional nature, molded of elastomer and ABS (acrylonitrile-butadiene-styrene copolymer) and combined into a control member 110 according to double-shot molding. In double-shot molding, parts formed from two materials are simultaneously molded in one mold.

Specifically, the key top 103 of ABS and the flexible key 104 of elastomer are simultaneously molded in one mold, so that the key top 103 and the flexible key 104 are integrally combined with each other. The flexible key 104 serves as a light guide to illuminate the key top 103 with light guided through the flexible key 104.

As shown in FIGS. 7 and 8, a plurality of LEDs 108a, 108b are disposed around a switch 107 on a printed-circuit board 105. When the switch 107 is pressed by a presser 106 mounted on a lower end of the control member 110, the LEDs 108a, 108b emit continuous or flickering light. Therefore, when the control member 110 is pressed, continuous or flickering light emitted by the LEDs 108a, 108b passes through the flexible key 104 as the light guide to the key top 103. It thus looks to the game player as if the control member 110 itself is emitting continuous or flickering light.

The key top 103 may be made of PC (polycarbonate) rather than ABS.

Figure 9:
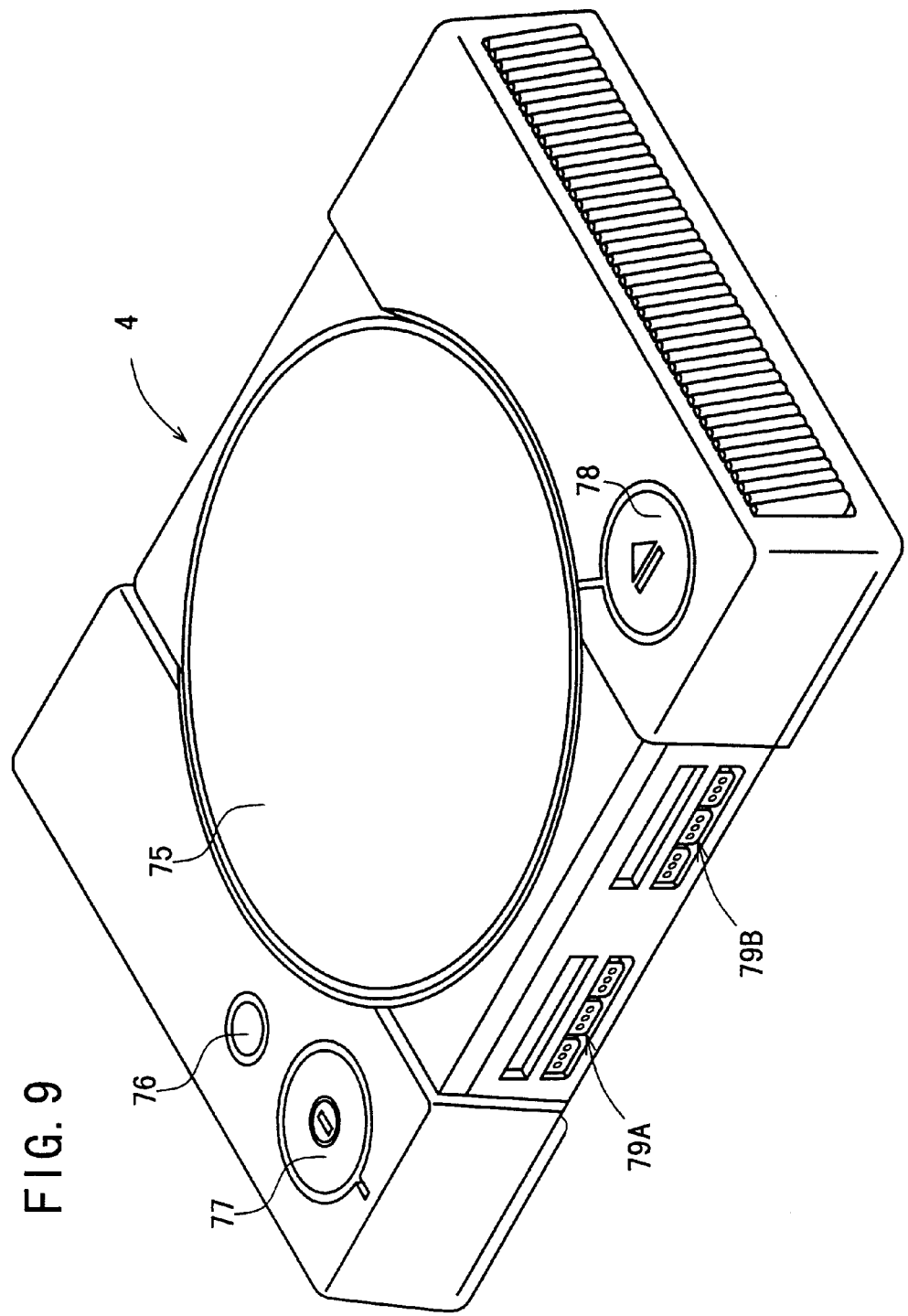
FIG. 9 is a perspective view of a video game machine of the video game apparatus.

Details of a structure and operation of the video game machine 4 will be described below with reference to FIGS. 9 and 10.

The video game machine 4 has a substantially rectangular casing which houses a disk loading unit 75 substantially centrally therein for loading an optical disk such as a CD-ROM or the like as a recording medium for supplying the game program. The casing supports a reset switch 76 for resetting the video game, a power supply switch 77, and a disk control switch 78 for controlling the loading of the optical disk into the disk loading unit 75, and has two slots 79A, 79B.

Two manual control input devices 2 can be connected to the respective slots 79A, 79B so that the video game may be played on the video game machine 4 by two users or game players. A memory card device and a portable electronic device may also be connected to the slots 79A, 79B. The video game machine 4 may have more or less than two slots 79A, 79B.

Figure 10:
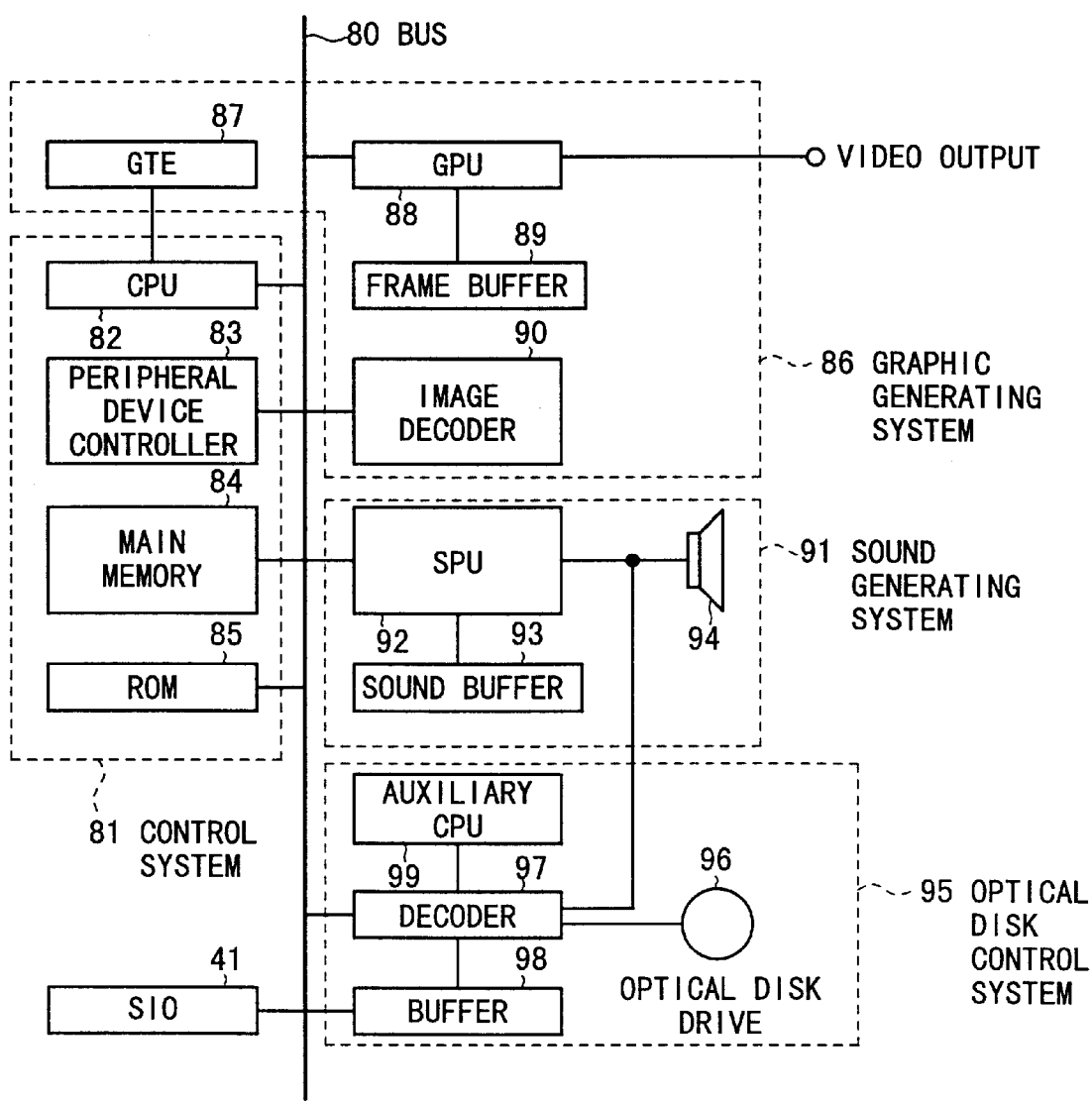
FIG. 10 is a block diagram of a circuit arrangement of the video game machine.

As shown in FIG. 10, the video game machine 4 has a control system 81 connected to a system bus 80, and a graphic generating system 86, a sound generating system 91, and an optical disk control system 95 which are connected to the control system 81 by the system bus 80.

The manual control input device 2 enters commands from the user or game player via the SIO 41 (see FIG. 2) to the video game machine 4. The optical disk control system 95 has an optical disk drive 96 in which a CD-ROM, as an example of the supply medium according to the present invention, is loaded.

The CD-ROM stores a program and data for giving operating guidance to explain the functions of the control members of the manual control input device 2 while causing the control members to emit continuous or flickering light on the display monitor 6, and also causing the corresponding control members to emit continuous or flickering light on the manual control input device 2 for thereby producing visual sensations for the game player.

The control system 81 controls the movement of a displayed character based on the program and data from the CD-ROM and commands entered from the manual control input device 2.

The control system 81 comprises a CPU (Central Processing Unit) 82, a peripheral device controller 83 for effecting interrupt control and controlling direct memory access (DMA) data transfer, a main memory 84 comprising a random-access memory (RAM), and a read-only memory (ROM) 85 which stores various programs such as an operating system for managing the graphic generating system 86, the sound generating system 91, etc. At least the game program can be executed in the main memory 84. The CPU 82 executes the operating system stored in the ROM 85 to control the video game apparatus 1 in its entirety, and comprises a 32-bit RISC-CPU, for example. Operating details of the CPU 82 will be described later on.

When the video game machine 4 is turned on, the CPU 82 executes the operating system stored in the ROM 85 to start controlling the graphic generating system 86, the sound generating system 91, etc. When the operating system is executed, the CPU 82 initializes the video game apparatus 1 in its entirety for confirming its operation, and thereafter controls the optical disk controller 95 to execute an application program, such as the video game, recorded in the optical disk. As the application program is executed, the CPU 82 controls the graphic generating system 86, the sound generating system 91, etc. depending on instructions entered from the game player for thereby controlling the display of images and the generation of music sounds and sound effects. While the video game is in progress, the CPU 82 enables the manual control input device 2 to emit continuous or flickering light in relation to continuous or flickering light emitted by a game character or object displayed on the display monitor 6.

The graphic generating system 86 comprises a geometry transfer engine (GTE) 87 for performing coordinate transformations and other processing, a graphic processing unit (GPU) 88 for plotting image data according to commands from the CPU 82, a frame buffer 89 for storing image data plotted by the GPU 88, and an image decoder 90 for decoding image data compressed and encoded by an orthogonal transform such as a discrete cosine transform.

The GTE 87 has a parallel arithmetic mechanism for performing a plurality of arithmetic operations parallel to each other, and can perform coordinate transformations and light source calculations and calculating matrixes or vectors at a high speed in response to a request from the CPU 82. Specifically, the GTE 87 can calculate the coordinates of a maximum of 1.5 million polygons per second for a flat shading process to plot one triangular polygon with one color, for example. With the GTE 87, the video game machine 4 is able to reduce the burden on the CPU 82 and perform high-speed coordinate calculations.

According to an image plotting command from the CPU 82, the GPU 88 plots a polygon or the like in the frame buffer 89. The GPU 88 is capable of plotting a maximum of 360 thousand polygons per second.

The frame buffer 89 comprises a dual-port RAM, and is capable of simultaneously storing image data plotted by the GPU 88 or image data transferred from the main memory 84, and reading image data for display. The frame buffer 89 has a storage capacity of 1 Mbytes, for example, and is handled as a 16-bit matrix made up of a horizontal row of 1024 pixels and a vertical column of 512 pixels.

The frame buffer 89 has a display area for storing image data to be output as video output data, a color look-up table (CLUT) area for storing a CLUT which will be referred to by the GPU 88 when it plots a polygon or the like, and a texture area for storing texture data to be subjected to coordinate transformations when a polygon is plotted and mapped onto a polygon plotted by the GPU 88. The CLUT area and the texture area are dynamically varied as the display area is varied.

The GPU 88 is capable of performing, in addition to the flat shading process, a Gouraud shading process for determining colors in a polygon by interpolating their intensities from the colors of the vertices of the polygon, and a texture mapping process for mapping texture data stored in the texture area onto a polygon. For the Gouraud shading process or the texture mapping process, the GTE 87 can calculate the coordinates of a maximum of 500 thousand polygons per second.

The image decoder 90 is controlled by the CPU 82 to decode image data of a still or moving image stored in the main memory 84, and store the decoded image in the main memory 84.

The image data reproduced by the image decoder 90 is transferred to the frame buffer 89 by the GPU 88, and can be used as a background for an image plotted by the GPU 88.

The sound generating system 91 comprises a sound processing unit (SPU) 92 for generating music sounds, sound effects, etc. based on commands from the CPU 82, a sound buffer 93 for storing waveform data from the SPU 92, and a speaker 94 for outputting music sounds, sound effects, etc. generated by the SPU 92.

The SPU 92 has an ADPCM (adaptive differential PCM) function for reproducing 16-bit sound data which has been encoded as 4-bit differential sound data by ADPCM, a reproducing function for reproducing the waveform data stored in the sound buffer 93 to generate sound effects, etc., and a modulating function for modulating and reproducing the waveform data stored in the sound buffer 93.

With these functions, the sound generating system 91 can be used as a sampling sound source which generates music sounds, sound effects, etc. based on the waveform data stored in the sound buffer 93 according to commands from the CPU 82.

The optical disk controller 95 comprises an optical disk drive 96 for reproducing programs and data recorded on an optical disk such as a CD-ROM or the like, a decoder 97 for decoding programs and data that are recorded with an error correcting code (ECC) added thereto, and a buffer 98 for temporarily storing data read from the optical disk drive 96 so as to allow the data from the optical disk to be read at a high speed. An auxiliary CPU 99 is connected to the decoder 97.

Sound data recorded on the optical disk which is read by the optical disk drive 96 includes PCM data converted from analog sound signals, in addition to the ADPCM data.

The ADPCM data, which is recorded as 4-bit differential data of 16-bit digital data, is decoded by the decoder 97, supplied to the SPU 92, converted thereby into analog data, and applied to drive the speaker 94.

The PCM data, which is recorded as 16-bit digital data, is decoded by the decoder 97 and then applied to drive the speaker 94.

The optical disk drive 96 reads the program for giving operating guidance based on visual sensations from the CD-ROM which is a specific example of the supply medium according to the present invention. The decoder 97 then decodes the program thus read by the optical disk drive 96.

In order to display the operating guide on the display monitor 6 and enable the control members of the manual control input device 2 to emit continuous or flickering light in relation to the displayed operating guide, it is necessary for the video game machine 4 to run an operating guidance program and data, in addition to a game program and data.

The operating guidance program will be described below. The operating guidance program is included in the game program, and executed when selected by the user or game player. The game program may be supplied from an optical disk such as a CD-ROM or distributed from a network. In the following description, it is assumed that the game program is read from a CD-ROM into the video game machine 4.

Figure 11:
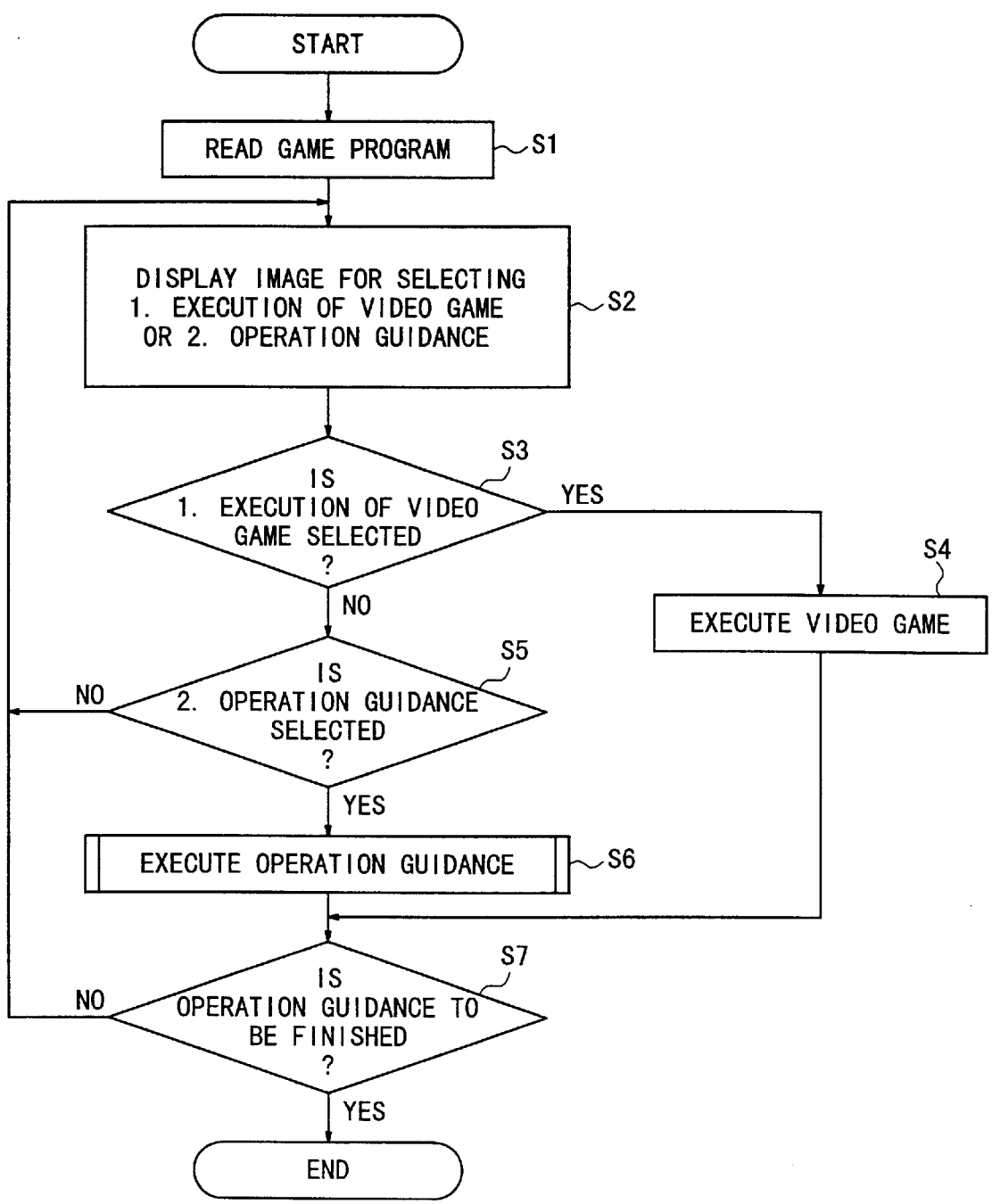
FIG. 11 is a flowchart of an operating sequence of the video game apparatus.

An operating sequence of the video game apparatus 1 will be described below with reference to FIG. 11.

In step S1, the CPU 82 of the video game machine 4 reads the game program from the CD-ROM, stores the game program into the main memory (RAM) 84, and executes the game program.

The CPU 82 displays an image asking the game player to select (1) the execution of a video game or (2) an operating guide on the display monitor 6 in step S2.

Then, the CPU 82 decides whether the execution of a video game has been selected in step S3. If the execution of a video game has been selected, then control goes to step S4, and the CPU 82 executes the video game. If the execution of a video game has not been selected, then control goes to step S5.

In step S5, the CPU 82 decides whether operating guidance has been selected. If operating guidance has been selected, then control goes to step S6, and the CPU 82 executes the operating guidance. If operating guidance has not been selected, then control goes back to step S2.

The execution of the operating guidance in step S6 will be described in detail below with reference to FIG. 12. After the operating guidance is finished, control proceeds to step S7 in which the CPU 82 prompts the game player to repeat the operating guidance once more or finish the operating guidance. Then, the operating sequence shown in FIG. 11 is ended.

Figure 12:
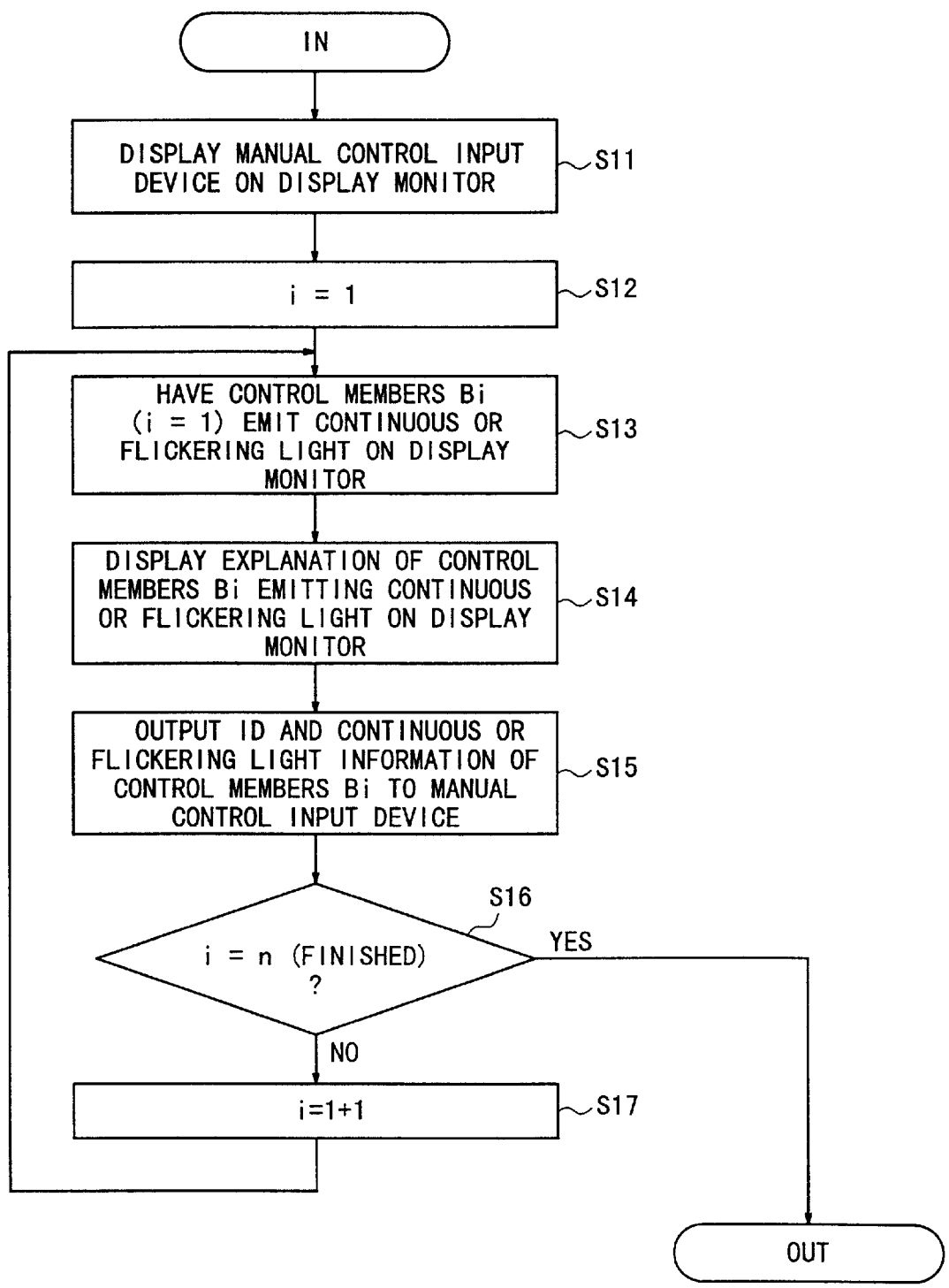
FIG. 12 is a flowchart of a guidance process in the operating sequence shown in FIG. 11.

The execution of the operating guidance in step S6 comprises a succession of steps shown in FIG. 12.

Figure 13A:
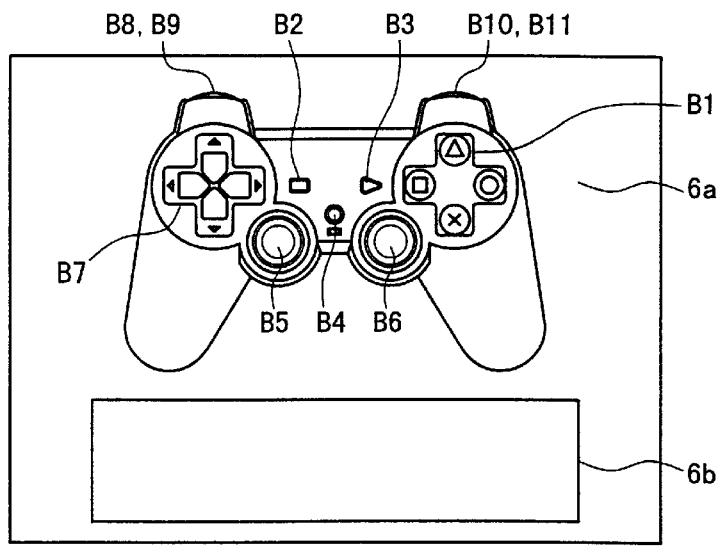
FIGS. 13A through 13C are views of images that are displayed on a display monitor when the guidance process shown in FIG. 12 is executed.

In step S11, the CPU 82 displays an overall image (e.g., a plan view) of the manual control input device 2 on a display screen 6a (see FIG. 1) of the display monitor 6, as shown in FIG. 13A.

In FIG. 13A, the control members of the second control pad 60 are collectively denoted by B1, the selection switch 70 by B2, the start switch 69 by B3, the third control pad 61 by B5, and the fourth control pad 62 by B6. Therefore, the control members and the switches of the manual control input device 2 are generally denoted by Bi.

Figure 13B:
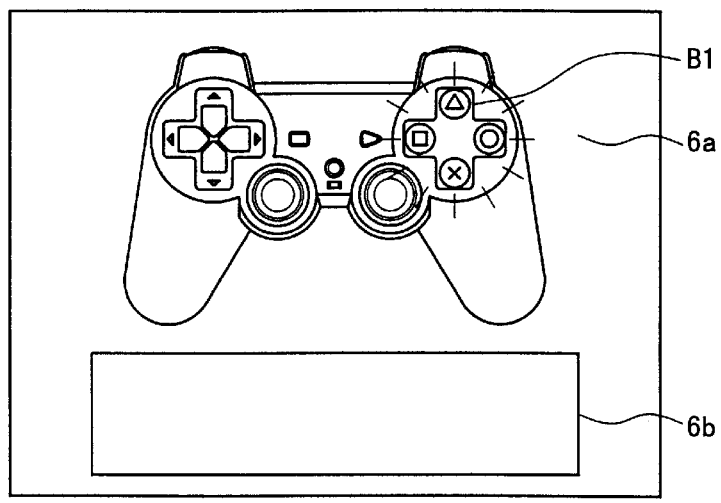

In step S12, the CPU 82 sets "i" of Bi to 1. Then, as shown in FIG. 13B, the CPU 82 controls the displayed control members B1 where "i"=1 to emit continuous or flickering light on the display screen 6a of the display monitor 6 in step S13.

Figure 13C:
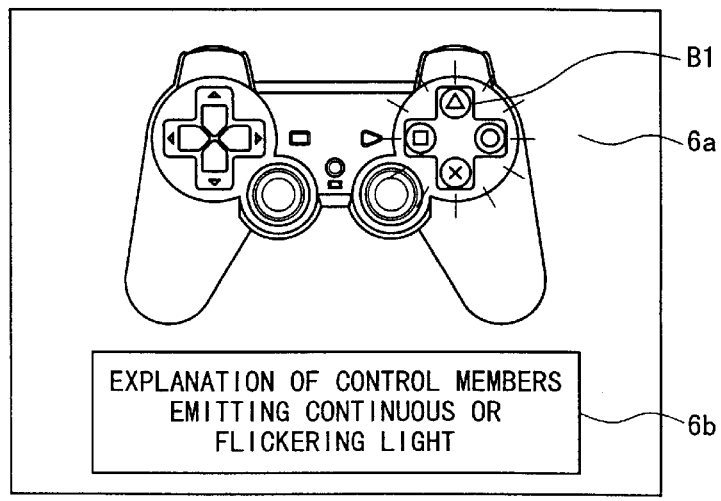

In step S14, the CPU 82 displays an explanation of the function of the control members B1 that emit continuous or flickering light on the display screen 6a in a remark area 6b, as shown in FIG. 13C.

In step S15, the CPU 82 outputs the ID and continuous or flickering light information of the control members B1 to the manual control input device 2.

Figure 14:
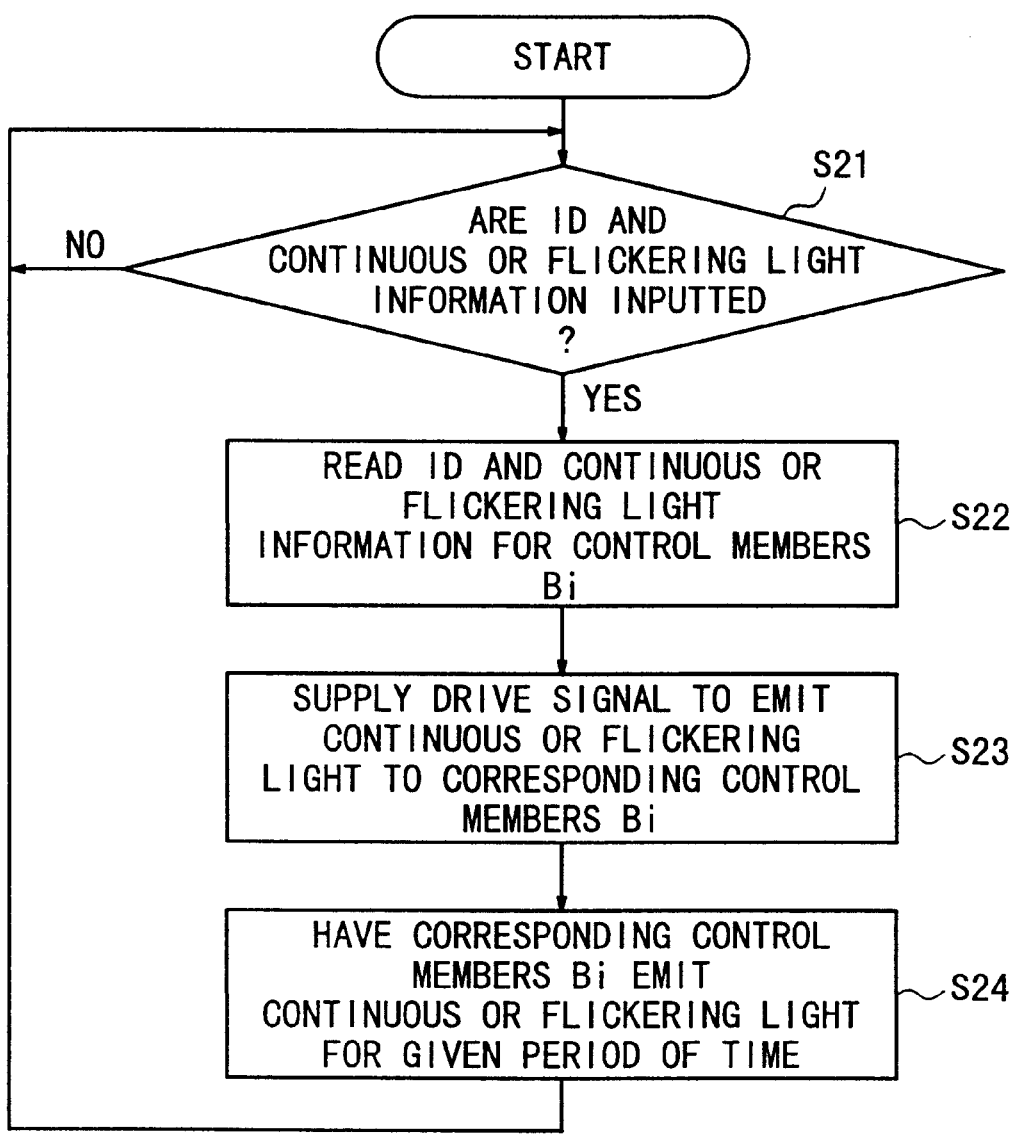
FIG. 14 is a flowchart of an operating sequence which is carried out by the manual control input device when the guidance process shown in FIG. 12 is executed.

Then, the microcomputer 22 of the manual control input device 2 executes an operating sequence shown in FIG. 14. As shown in FIG. 14, if the ID and continuous or flickering light information of the control members B1 are input from the video game machine 4 in step S21, then control goes to step S22 in which the microcomputer 22 reads the ID and continuous or flickering light information of the control members B1.

In step S23, the microcomputer 22 supplies a drive signal to the control members B represented by the ID to enable the control members B to emit continuous or flickering light. Specifically, in FIG. 2, the microcomputer 22 supplies the drive signal to corresponding ones of the light-emitting elements $202_1, 202_2, \ldots 202_n$ of the switches $20_1, 20_2, \ldots 20_n$ via the amplifiers $201_1, 201_2, \ldots 201_n$.

In step S24, the control members B1 emit continuous or flickering light for a predetermined period of time. In FIG. 15, the control members of the manual control input device 2 which correspond to the control members B1 displayed on the display screen 6a are shown as emitting continuous or flickering light.

Referring back to FIG. 12, the processing from step S13 is repeated until "i" reaches a predetermined number n in steps S16, S17. If "i"=n in step S16, then the operating guidance shown in FIG. 12 is ended.

Figure 16A:
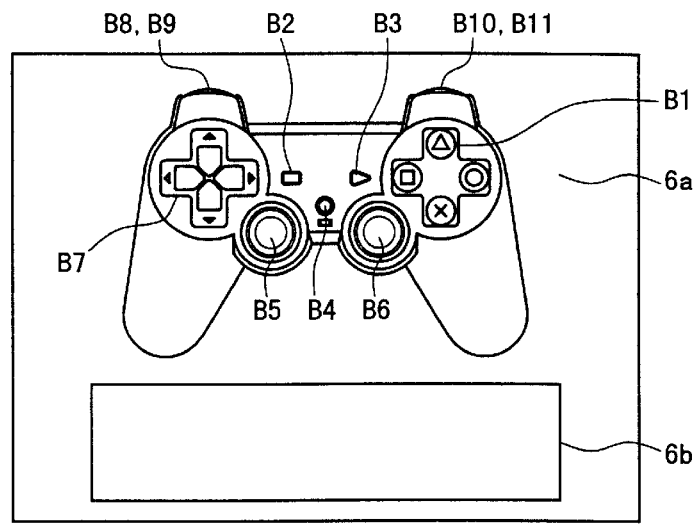
FIGS. 16A through 16C are views of other images that are displayed on the display monitor when the guidance process shown in FIG. 12 is executed.
Figure 16B:
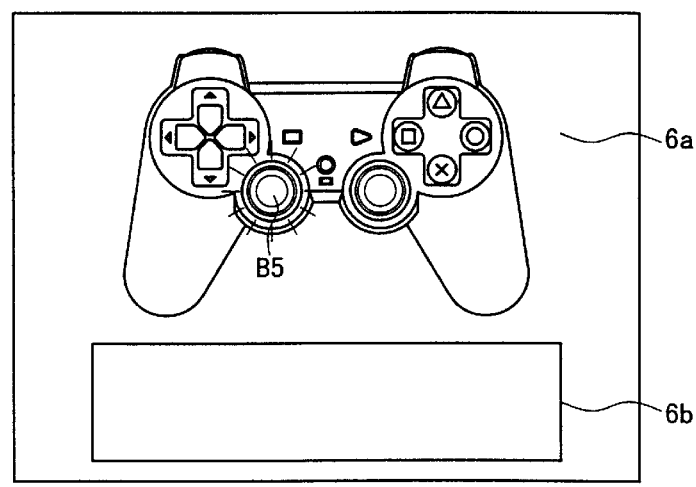
Figure 16C:
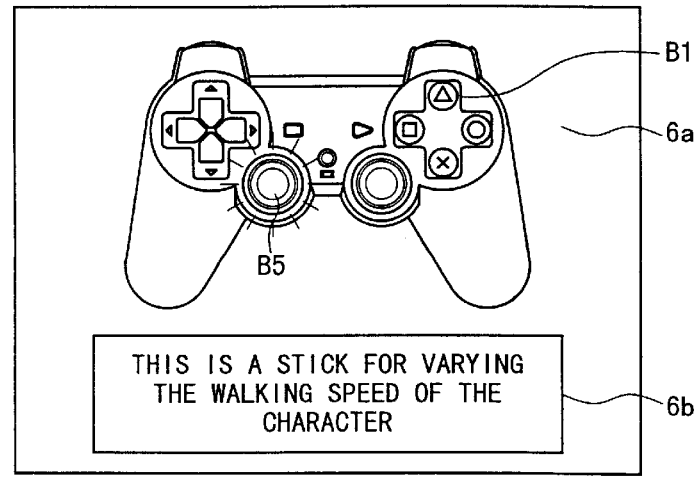

Images that are displayed on the display screen 6a in the processing from step S13 after "i"=5 in step S17 are shown in FIGS. 16A through 16C.

FIG. 16A shows an overall image of the manual control input device 2 displayed on the display screen 6a of the display monitor 6. FIG. 16B shows the third control pad B5 that emits continuous or flickering light in step S13. FIG. 16C shows an explanation of the function of the third control pad B5 that emits continuous or flickering light on the display screen 6a in the remark area 6b in step S14.

Thereafter, the CPU 82 outputs the ID and continuous or flickering light information of the third control pad B5 to the manual control input device 2 in step S15. Then, control goes to the operating sequence shown in FIG. 14, in which the microcomputer 22 enables the corresponding third control pad 61 of the manual control input device 2 to emit continuous or flickering light for a predetermined period of time.

Figure 17A:
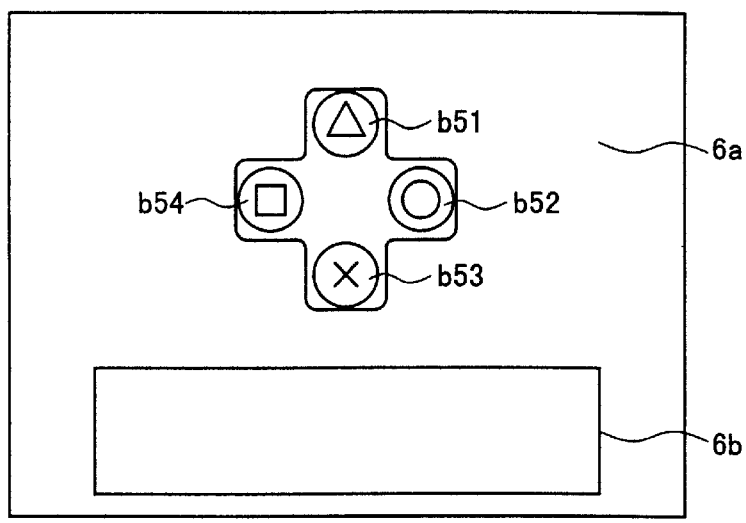
FIGS. 17A through 17C are views of still other images that are displayed on the display monitor when the guidance process shown in FIG. 12 is executed.
Figure 17B:
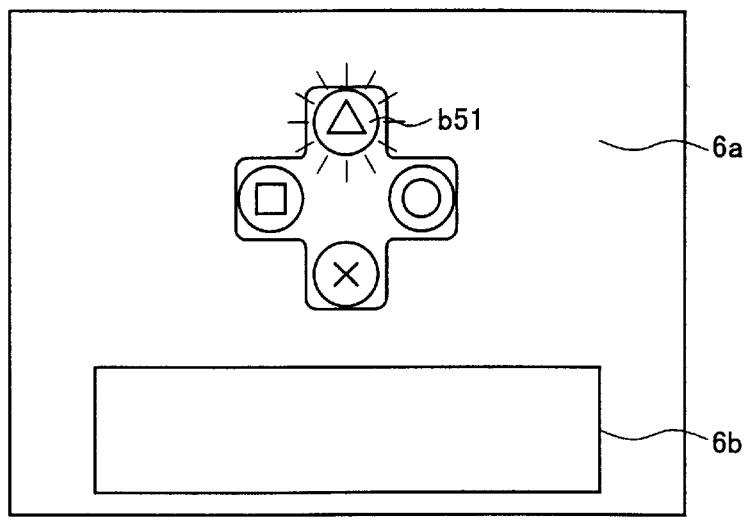
Figure 17C:
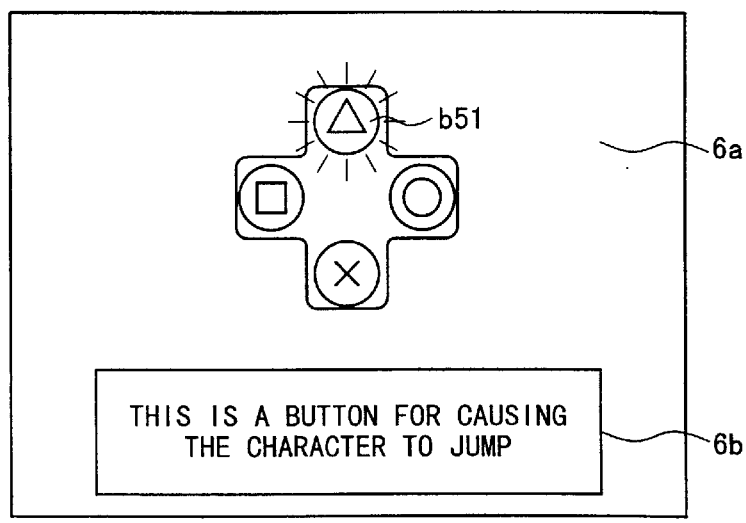

In step S13 shown in FIG. 12, after the control members B1 where "i"=1 are displayed on the display screen 6a as shown in FIG. 16A, one (e.g., b51) of the control members b51, b52, b53, b54 (see FIG. 17A) may be controlled to emit continuous or flickering light as shown in FIG. 17B, and the explanation of the control member b51 may be displayed in the remark area 6b as shown in FIG. 17C. The display of the continuous or flickering light emission and the explanation is then repeated with respect to the remaining control members b52, b53, b54. This display mode is particularly effective for those control pads which comprise a plurality of control members, e.g., the first control pad 59 and the second control pad 60.

Figure 18:
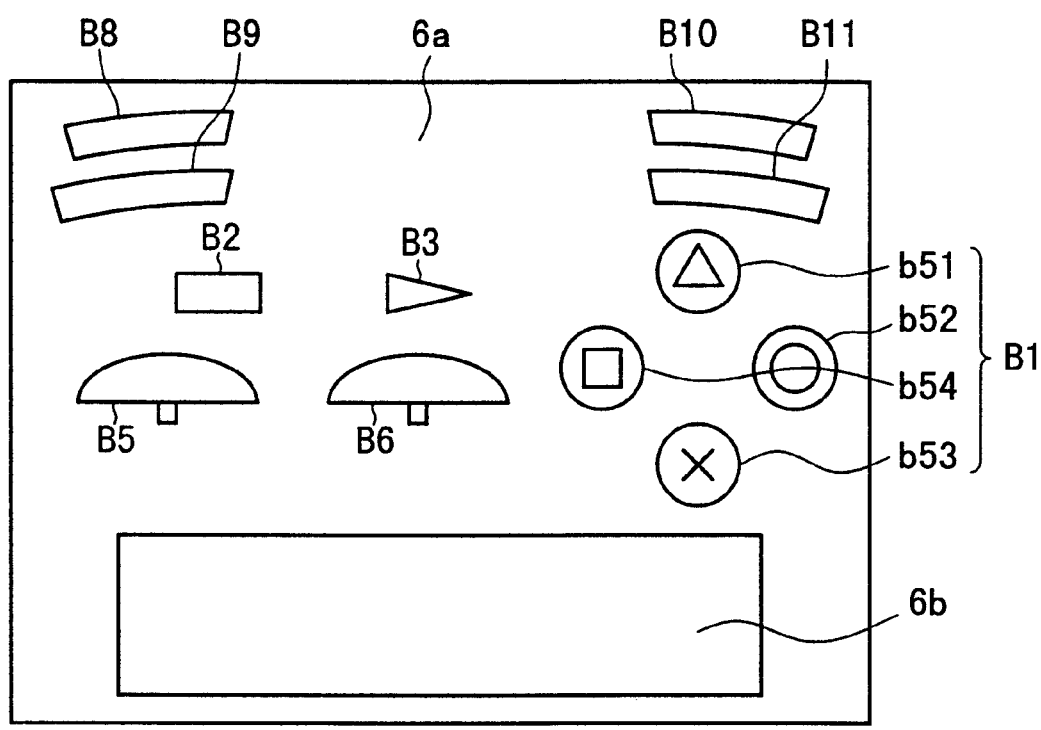
FIG. 18 is a view of an image that is displayed on the display monitor, illustrating another guidance process.

FIG. 18 illustrates another process for providing an operating guide for the manual control input device 2. According to the guidance process illustrated in FIG. 18, only control members are displayed on the display screen 6a, and the user or game player is allowed to select a desired one of the displayed control members. When a displayed control member is selected by the game player, its explanation is displayed in the remark area 6b. A drive signal for emitting continuous or flickering light may be sent to the manual control input device 2 at any desired time to enable the selected control member to emit continuous or flickering light in synchronization with the display of the explanation.

Figure 19:
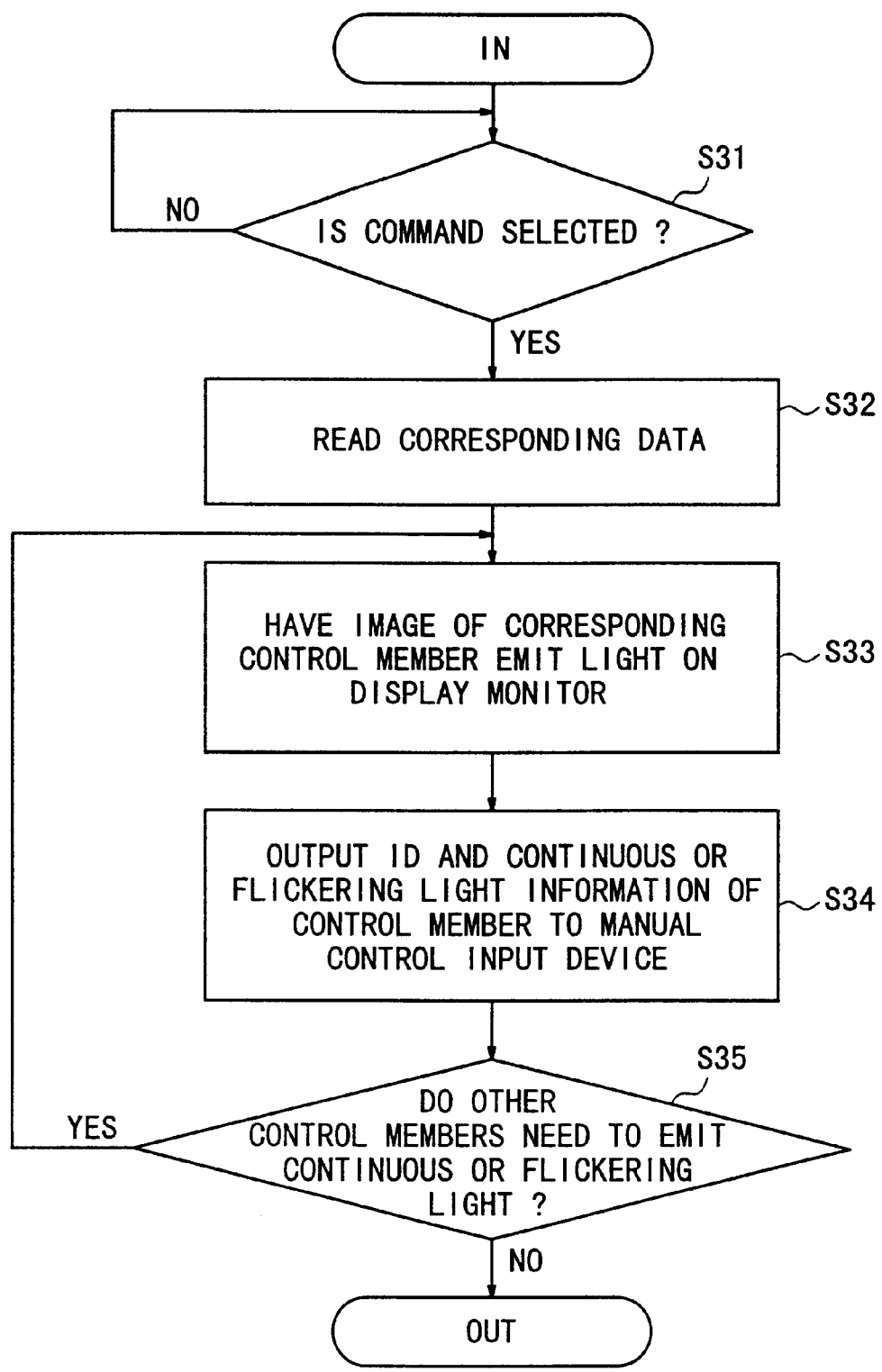
FIG. 19 is a flowchart of still another guidance process.
Figures 20, 21:
FIG. 20 is a view of a command selection image displayed when the guidance process shown in FIG. 19 is executed.
FIG. 21 is a view of a data table that is referred to when the guidance process shown in FIG. 19 is executed.

The guidance process illustrated in FIG. 18 may be carried out according to an operating sequence shown in FIG. 19. In the operating sequence shown in FIG. 19, commands shown in FIG. 20 are displayed on the display screen 6a of the display monitor 6. If one of the displayed commands is selected by the game player in step S31, then control proceeds to step 32 in which data corresponding to the selected command is read from a data table shown in FIG. 21. The data table shown in FIG. 21 contains the commands and control member types and their sequences in association with the commands. The data table is read together with the game program into the main memory (RAM) 84 of the video game machine 4.

Figure 22A:
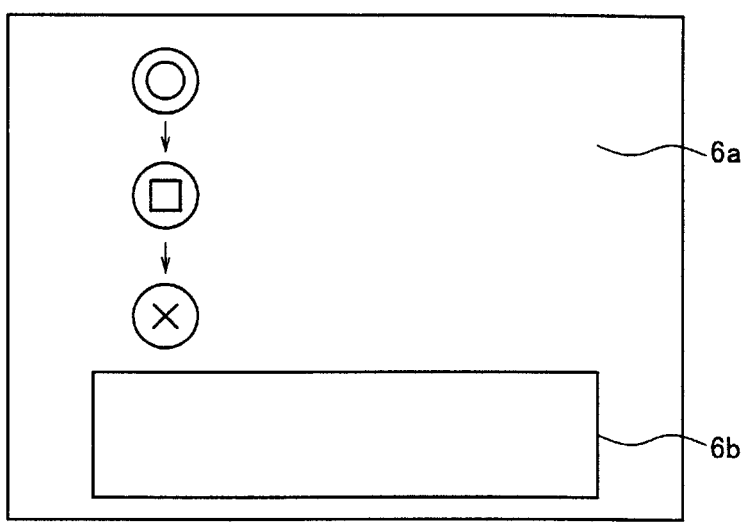
FIGS. 22A through 22C are views of images that are displayed on the display monitor when the guidance process shown in FIG. 19 is executed.
Figure 22B:
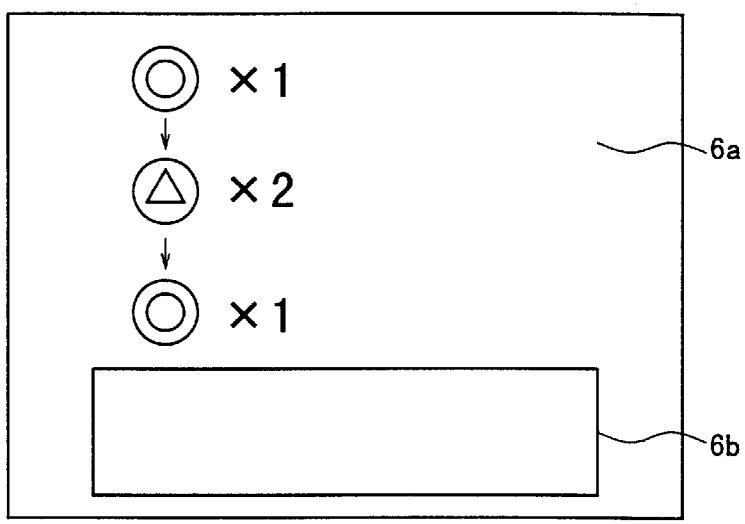
Figure 22C:
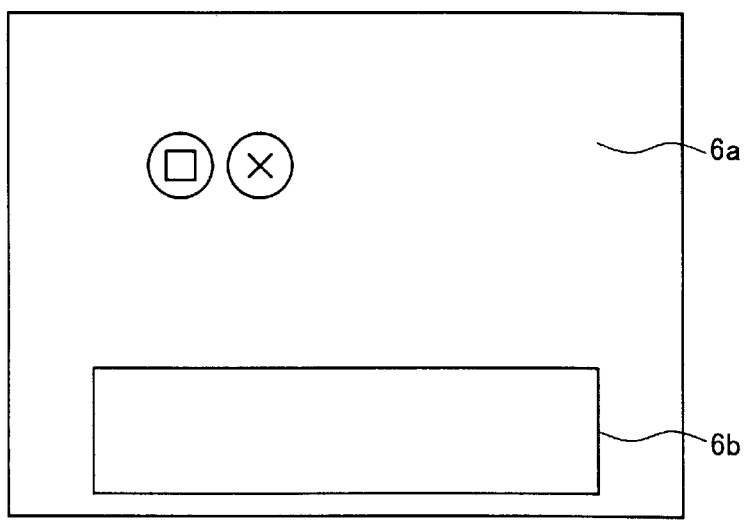

In step S33, corresponding control members are displayed on the display screen 6a as shown in FIG. 22A and sequentially emit continuous or flickering light, and the selected command is displayed in the remark area 6b. If a complex control action such as to successively press control members is required, then the number of times that each of the control members is to be pressed may also be displayed as shown in FIG. 22B. If control members are required to be pressed simultaneously, those control members which are required to be pressed simultaneously may be displayed as shown in FIG. 22C.

In step S34, the CPU 82 outputs the ID and continuous or flickering light information of the control members to the manual control input device 2. A specific example of the ID and continuous or flickering light information output from the CPU 82 is shown in FIG. 23.

In step S35, the CPU 82 decides whether other control members need to emit continuous or flickering light on the display screen 6a and also on the manual control input device 2. If other control members need to emit continuous or flickering light, then control returns to step S33. If no other control members need to emit continuous or flickering light, then the operating sequence shown in FIG. 19 comes to an end.

With the video game apparatus 1 according to the present invention, as described above, the game program is explained by not only the user's manual but also visual sensations given to the game player by controlling the control members to emit continuous or flickering light on the display screen 6a and also on the manual control input device 2.

Although certain preferred embodiments of the present invention have been shown and described in detail, it should be understood that various changes and modifications may be made therein without departing from the scope of the appended claims.

What is claimed is:

1. An entertainment system, comprising:
   a manual control input device for entering control commands, said manual control input device having a plurality of control members;
   a display monitor for displaying an image of said manual control input device;
   a video game machine for generating an image of a game character to be displayed on said display monitor; and
   a controller responsive to a signal sent from said video game machine to said manual control input device and to emission of continuous or flickering light from one or more of said control members in said displayed image of said manual control input device, for energizing a corresponding one or more of said control members of said manual control input device to emit continuous or flickering light in synchronization with said emission of continuous or flickering light from said displayed image.

2. An entertainment system according to claim 1, wherein said controller comprises means for controlling said display monitor to display, in addition to said image of said manual control input device, an operating guide for said one or more of said control members which emit continuous or flickering light.

3. An entertainment system according to claim 1, wherein said one or more of said control members in said displayed image of said manual control input device which emit continuous or flickering light are selected by a user via said manual control input device.

4. An entertainment system according to claim 3, wherein said controller comprises means for controlling said display monitor to display a plurality of commands and an operating sequence for said control members to execute one of said plurality of commands selected by a user, and for enabling ones of said control members in said displayed image of said manual control input device and corresponding ones of said control members of said manual control input device to emit continuous or flickering light in synchronization with each other.

5. An entertainment system according to claim 1, wherein said controller comprises means for controlling said display monitor to display an operating sequence for executing a program as an operating guide based on a selection made by a user, and for enabling ones of said control members in said displayed image of said manual control input device and corresponding ones of said control members of said manual control input device to emit continuous or flickering light in synchronization with each other according to said operating sequence.

6. An entertainment system, comprising:
   a manual control input device for entering control commands, said manual control input device having a plurality of control members;
   a display monitor for displaying a game image;
   a video game machine for generating an image of a game character to be displayed on said display monitor in response to control commands entered by said manual control input device for proceeding with a video game;
   an operating guidance program for displaying an operating guide on said display monitor and for enabling said control members of said manual control input device to emit continuous or flickering light;
   a memory medium storing said operating guidance program; and
   a processor for executing said operating guidance program based on control commands entered by said manual control input device, wherein said processor includes means for producing a control signal to enable said control members of said manual control input device to emit said continuous or flickering light in response to a signal sent from said video game machine to said manual control input device and to emission of continuous or flickering light from one or more of said control members in said displayed image of said manual control input device.

7. An entertainment system according to claim 6, further comprising a recording medium storing said operating guidance program, wherein said memory medium reads said operating guidance program from said recording medium and stores said read operating guidance program.

8. An entertainment system according to claim 6, further comprising communication means for communicating with a source, wherein said memory medium reads said operating guidance program via said communication means and stores said read operating guidance program.

9. An entertainment system according to claim 6, wherein said memory medium stores a program for enabling said control members to emit continuous or flickering light sequentially and for displaying said operating guide for at least said one or more of said control members which are emitting continuous or flickering light on said display monitor.

10. An entertainment system according to claim 6, wherein said memory medium stores a program for displaying only said control members on said display monitor and for displaying said operating guide for at least one of said control members which is selected by a user on said display monitor.

11. An entertainment system according to claim 6, wherein said memory medium stores a program for displaying on said display monitor a plurality of commands and an operating sequence for said control members to execute one of said plurality of commands selected by a user.

12. A supply medium recorded with an operating guidance program and data for operating an entertainment system including a manual control input device having a plurality of control members for entering control commands, a display monitor for displaying an image of the manual control input device, and a video game machine for generating an image of a game character to be displayed on the display monitor, the program comprising:

detecting a signal sent from the video game machine to the manual control input device;

detecting emission of continuous or flickering light from one or more of the control members in the displayed image of the manual control input device; and in response to detecting the signal and the emission of continuous or flickering light from the displayed image, energizing a corresponding one or more of the control members of the manual control input device to emit continuous or flickering light in synchronization with the emission of continuous or flickering light from the displayed image.

13. A supply medium according to claim 12, wherein the operating guidance program enables the display monitor to display, in addition of the image of the manual control input device, an operating guide for the one or more of the control members which emit continuous or flickering light.

14. A supply medium according to claim 12, wherein the one or more of the control members in the displayed image of the manual control input device which emit continuous or flickering light are selected by a user via the manual control input device.

15. A supply medium according to claim 14, wherein the operating guidance program enables the display monitor to display a plurality of commands and an operating sequence for the control members to execute one of the plurality of commands selected by a user, and for enabling ones of the control members in the displayed image of the manual control input device and corresponding ones of the control members of the manual control input device to emit continuous or flickering light in synchronization with each other.

16. A supply medium according to claim 12, wherein the operating guidance program enables the display monitor to display an operating sequence for executing a program as an operating guide based on a selection made by a user, and enables ones of the control members in the displayed image of the manual control input device and corresponding control members of the manual control input device to emit continuous or flickering light in synchronization with each other according to the operating sequence.

17. A supply medium recorded with an operating guidance program and data for an entertainment system including a video game machine for playing a video game, a manual control input device having a plurality of control members for entering control commands to the video game machine, and a display monitor for displaying a game character in response to the control commands entered by the manual control input device, the operating guidance program comprising:

displaying an operating guide on the display monitor; and enabling the control members of said manual control input device to emit continuous or flickering light in relation to the operating guide.

18. A supply medium according to claim 17, wherein the operating guidance program further includes:

enabling the control members to emit the continuous or flickering light sequentially; and displaying on the display monitor the operating guide for at least the control members which are emitting the continuous or flickering light.

19. A supply medium according to claim 17, wherein the operating guidance program further includes:

displaying only the control members on the display monitor; and displaying the operating guide for at least one of the control members which is selected by a user on the display monitor.

20. A supply medium according to claim 17, wherein the operating guidance program further includes:

displaying on the display monitor a plurality of commands and an operating sequence for the control members to execute one of the plurality of commands selected by a user.

* * * * *

UNITED STATES PATENT AND TRADEMARK OFFICE
CERTIFICATE OF CORRECTION

PATENT NO.    : 6,409,601 B2
DATED         : June 25, 2002
INVENTOR(S)   : Ogata et al.

It is certified that error appears in the above-identified patent and that said Letters Patent is hereby corrected as shown below:

<u>Column 11,</u>
Lines 56 and 57, "B" should read -- B1 --.

Signed and Sealed this

Eleventh Day of February, 2003

JAMES E. ROGAN
*Director of the United States Patent and Trademark Office*